US012691472B2

(12) United States Patent
Dadlani

(10) Patent No.: US 12,691,472 B2
(45) Date of Patent: Jul. 28, 2026

(54) AIR SORTING UNIT

(71) Applicant: ISHITVA ROBOTIC SYSTEMS PVT LTD, Ahmedabad (IN)

(72) Inventor: Jitesh Dadlani, Ahmedabad (IN)

(73) Assignee: ISHITVA ROBOTIC SYSTEMS PVT LTD., Ahmedabad (IN)

( * ) Notice: Subject to any disclaimer, the term of this patent is extended or adjusted under 35 U.S.C. 154(b) by 0 days.

(21) Appl. No.: 18/549,139

(22) PCT Filed: Mar. 4, 2022

(86) PCT No.: PCT/IN2022/050193
§ 371 (c)(1),
(2) Date: Sep. 5, 2023

(87) PCT Pub. No.: WO2022/185341
PCT Pub. Date: Sep. 9, 2022

(65) Prior Publication Data
US 2024/0149305 A1 May 9, 2024

(30) Foreign Application Priority Data
Mar. 4, 2021 (IN) ............................ 202121009107

(51) Int. Cl.
*B07C 5/36* (2006.01)
*B07C 5/342* (2006.01)

(52) U.S. Cl.
CPC .............. *B07C 5/361* (2013.01); *B07C 5/342* (2013.01); *B07C 5/368* (2013.01); *B07C 2501/0054* (2013.01)

(58) Field of Classification Search
CPC ......... B07C 5/361; B07C 5/368; B07C 5/342; B07C 2501/0054
(Continued)

(56) References Cited

U.S. PATENT DOCUMENTS 5,305,894 A * 4/1994 McGarvey ............ B07C 5/3422 209/639
5,460,271 A * 10/1995 Kenny ............... B65G 47/1492 198/453
(Continued)

FOREIGN PATENT DOCUMENTS

EP 1240951 9/2002
WO 2018200866 11/2018

OTHER PUBLICATIONS

PCT Application No. PCT/IN2022/050193, International Search Report, Jun. 14, 2022.

*Primary Examiner* — Molly K Devine
(74) *Attorney, Agent, or Firm* — KNH LLP

(57) ABSTRACT

The present invention discloses an automated waste sorter (100) for sorting/segregating one or more categories of materials from a mixed waste stream. The automated waste sorter (100) includes a primary conveyor belt (110), an encoder (170), one or more sensors (131), a vision system (130) and an ejection means (150). The primary conveyor belt (110) moves the mixed waste stream at a predefined speed. The vision system (130) is trained to analyze the frame to identify, classify and locate one or more classified waste material using at least one of a plurality of identity parameters and/or a plurality of other parameters. The ejection means (150) includes one or more manifolds to eject the one or more classified waste material based on the one or more coordinates communicated by the vision system (130). A method to operate the automated waste sorter (100) is also disclosed.

2 Claims, 4 Drawing Sheets

(58) Field of Classification Search
USPC .................................................. 209/577, 639
See application file for complete search history.

(56) References Cited

U.S. PATENT DOCUMENTS

| | | | | | |
|---|---|---|---|---|---|
| 5,676,256 | A * | 10/1997 | Kumar | B07C 5/3422 | |
| | | | | 209/939 | |
| 6,335,501 | B1 | 1/2002 | Khalfan | | |
| 10,799,915 | B2 * | 10/2020 | Horowitz | B07C 5/367 | |
| 2003/0038064 | A1 * | 2/2003 | Harbeck | B07C 5/344 | |
| | | | | 209/939 | |
| 2009/0251536 | A1 * | 10/2009 | Sinram | B07C 5/342 | |
| | | | | 348/91 | |
| 2018/0243800 | A1 * | 8/2018 | Kumar | G06N 20/00 | |
| | | | | 209/586 | |

* cited by examiner

AIR SORTING UNIT

FIELD OF INVENTION

The present invention relates to a waste sorter. More specifically, the present invention relates to an automated air sorting unit to sort waste.

BACKGROUND

The amount of waste generated per day is ever increasing with the increase in global population. Due to this, it is of paramount importance that a waste material recovery facility that can accurately sort and/or segregate waste materials be used to facilitate efficient recycling processes thereby, reducing environmental burden.

A materials recovery facility (MRF) is a specialized plant that receives, separates and prepares recyclable materials. The efficiency of a MRF plant depends upon the operation speed and accuracy of material sorting.

The operation speed of such plants is defined by per hour waste processing capacity of the plant. The accuracy of such plants is defined by the ability to differentiate two different waste materials irrespective of their state (discolored, dirty, distorted, etc.). An ideal MRF plant should be able to accurately sort the waste materials in high volumes without compromising on the speed of sorting.

Conventional MRF plants make use of line sensors including NIR, SWIR, LWIR, LASER, X-ray, etc. to identify and locate the waste material (sensors measures light reflectance). These sensors are generally mounted over a running conveyor belt carrying a stream of waste materials. Once the desired waste material, as instructed by a user, is detected over the conveyor belt by the line sensors; the said waste material is removed from the conveyor belt.

However, the said line sensors fail to meet the ever increasing industry and environmental standards. The line sensors used in the conventional MRF plants are only capable of scanning the topmost layer/surface (layer of dirt, oil, wrapper/label, etc.) of the waste material which results in false and/or improper identification. For example, a polymer PET bottle may have a polymer PP wrapper on top of it leading to false identification of the bottle as PP instead of PET by the conventional line sensors.

More often than not, the conveyor belts are black/dark in color and the line sensors due to their technical limitation fail to detect a black/dark object (waste material) present over the said conveyor belt. The said limitation may be surpassed by increasing the wavelength support of the sensors thereby, increasing the cost of the sensors. These shortcomings of the line sensors adversely affect the accuracy of the MRF plant to sort waste.

Therefore, there arises a requirement of an automated waste sorter which accurately detects and sorts the waste material without compromising on the speed of operation.

SUMMARY

The present invention relates to an automated waste sorter for sorting/segregating one or more categories of materials from a mixed waste stream. The automated waste sorter includes a primary conveyor belt, an encoder, one or more sensors, a vision system and an ejection means. The primary conveyor belt moves the mixed waste stream at a predefined speed. The encoder operationally is coupled to the primary conveyor belt to detect the predefined speed of the primary conveyor belt. The one or more sensors captures a predefined area of the primary conveyor belt in a frame based on the inputs of the encoder. The vision system is operationally coupled to the one or more sensors, the encoder and the primary conveyor belt. The vision system is trained to analyze the frame to identify, classify and locate from the mixed waste stream one or more classified waste material using at least one of a plurality of identity parameters and/or a plurality of other parameters. The vision system being further configured to determine one or more coordinates that correlate with a location of the classified waste material on the primary conveyor belt. The ejection means includes one or more manifolds to eject the one or more classified waste material based on the one or more coordinates communicated by the vision system. A method to operate the automated waste sorter is also disclosed.

The foregoing features and other features as well as the advantages of the invention will become more apparent from the following detailed description, which proceeds with reference to the accompanying figures.

BRIEF DESCRIPTION OF DRAWINGS

The summary above, as well as the following detailed description of illustrative embodiments, is better understood when read in conjunction with the apportioned drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale.

DETAILED DESCRIPTION OF THE DRAWINGS

Figure 1:
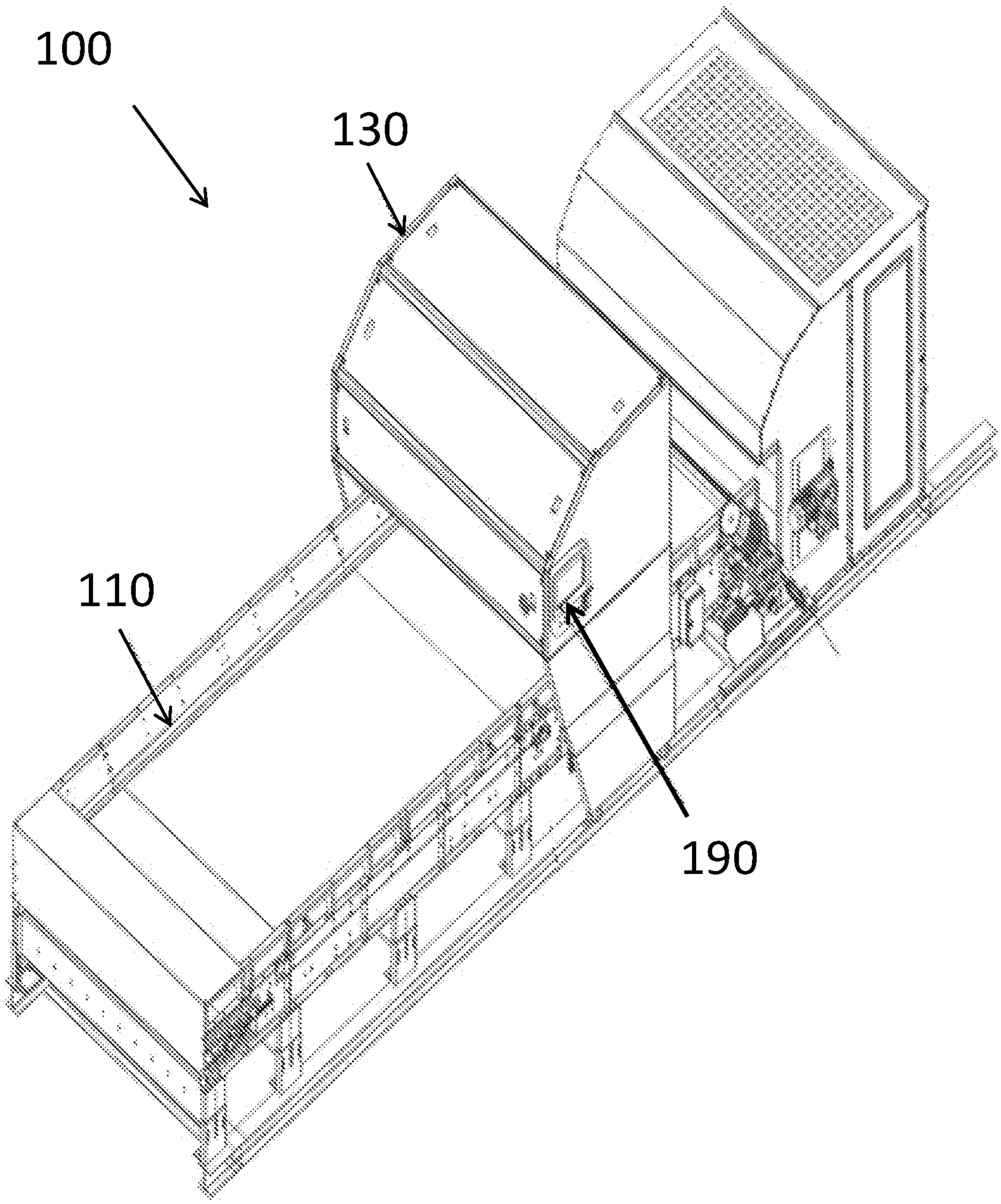
FIG. 1 depicts a waste sorter 100 in accordance with an embodiment of the present invention.

Prior to describing the invention in detail, definitions of certain words or phrases used throughout this patent document will be defined: the terms "include" and "comprise", as well as derivatives thereof, mean inclusion without limitation; the term "or" is inclusive, meaning and/or; the phrases "coupled with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have a property of, or the like; Definitions of certain words and phrases are provided throughout this patent document, and those of ordinary skill in the art will understand that such definitions apply in many, if not most, instances to prior as well as future uses of such defined words and phrases.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Although the operations of exemplary embodiments of the disclosed method may be described in a particular, sequential order for convenient presentation, it should be understood that the disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed herein. Moreover, for the sake of simplicity, the attached figures may not show the various ways in which the disclosed system, method, and apparatus can be used in combination with other systems, methods, and apparatuses.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments. These features and advantages of the embodiments will become more fully apparent from the following description and apportioned claims, or may be learned by the practice of embodiments as set forth hereinafter.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program.

The term 'mixed waste stream' in the below description corresponds to a heterogeneous or homogeneous waste stream having household, economic and/or commercial value. The mixed waste stream includes a mixture of different types of wastes as received from a pre-defined waste generation source. The different types of waste may include without limitation plastic, paper, films, glass, rubber, metal, electronic waste, tetra pack, multi-layer packaging (MLP), cardboard, etc.

In accordance with the present disclosure, an automated air sorting unit (or waste sorter) is disclosed. The waste sorter of the present invention is a fully automated system which is capable of accurately sorting/segregating one or more categories of materials from a mixed waste stream. The said materials include without limitation recyclable material, waste material, etc.

The waste sorter of the present invention includes a vision system that is capable of identifying a waste material in one of an intact/complete state, a distorted state, a torn/partial state, a soiled state, or a discolored state thereby improving efficiency and accuracy of the waste sorter. Further, an ejection means of the waste sorter helps in accurately ejecting one or more classified waste materials from a primary conveyor belt without compromising on the operating speed of the waste sorter. In an embodiment, the operating speed of the waste sorter is further enhanced by an operational coupling between a controller and an encoder which improves coordination and communication between various components of the waste sorter with reduced latency. Alternately, the operation speed of the waste sorter is enhanced by an operational coupling between the vision system and the encoder or between one or more sensors of the vision system and the encoder.

Figure 2:
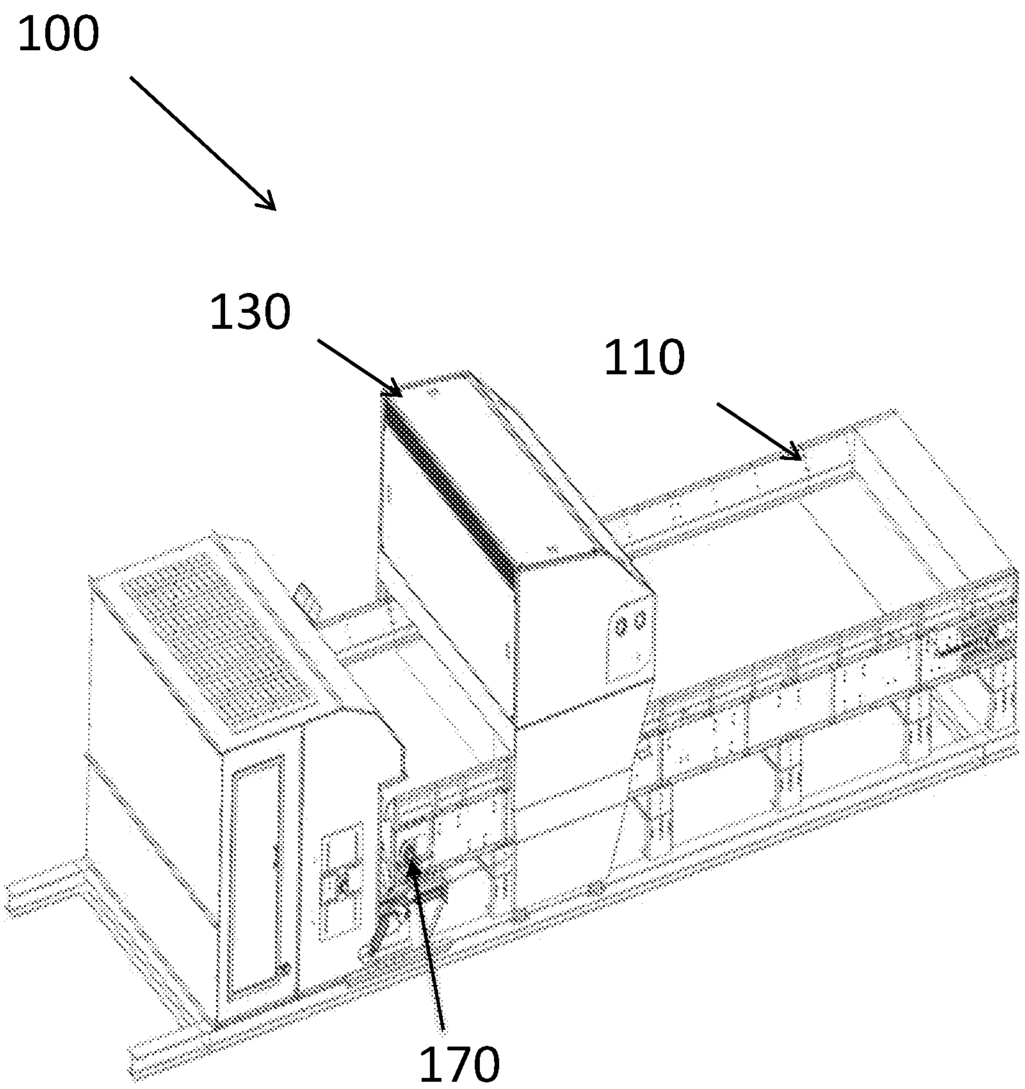
FIG. 2 depicts a side view of the waste sorter 100 in accordance with an embodiment of the present invention.
Figure 3:
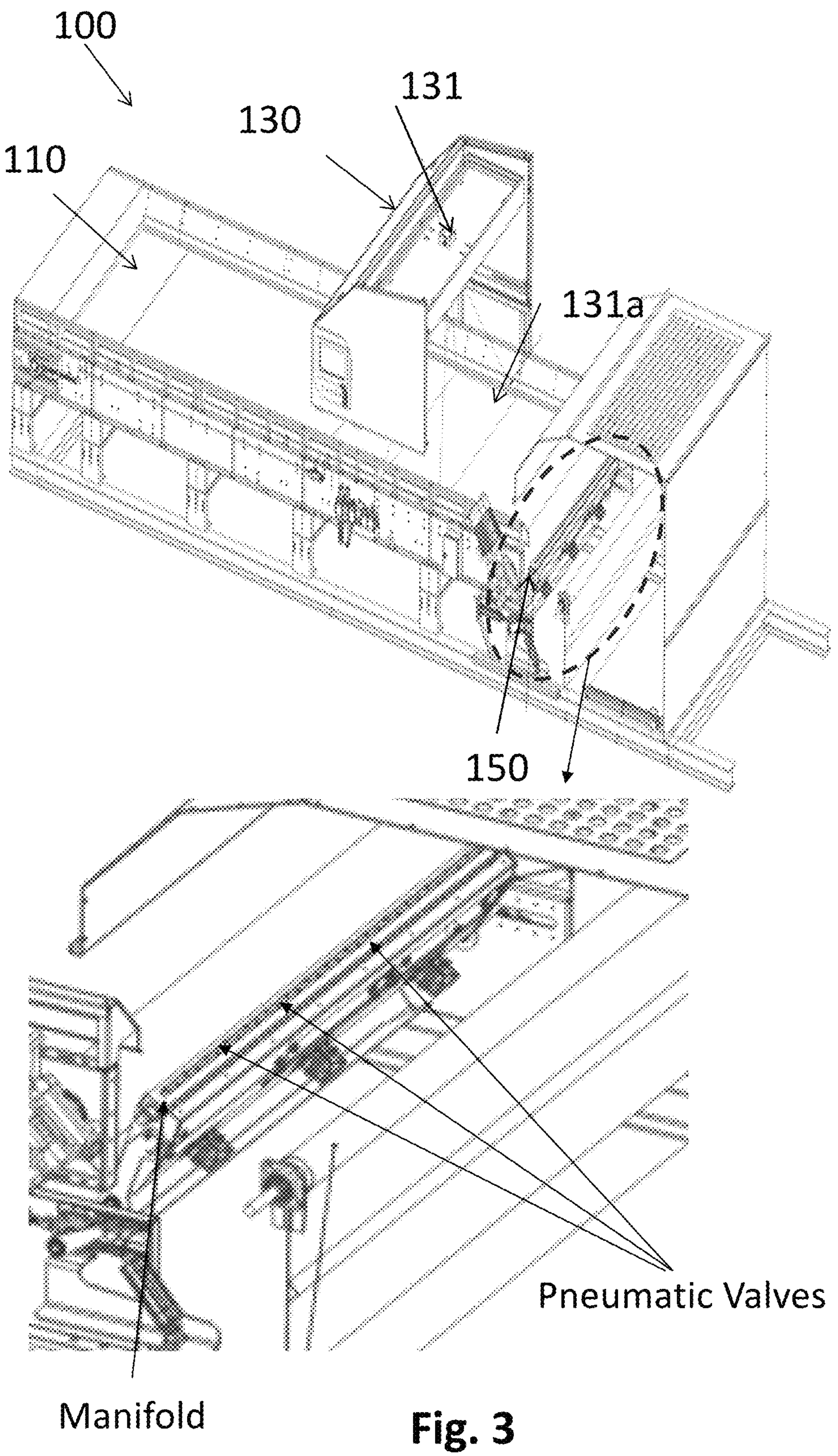
FIG. 3 depicts a partial cross-section of the waste sorter 100 in accordance with an embodiment of the present invention.

Now referring to the figures, FIG. 1-3 depicts a waste sorter 100 of the present invention which includes various components that are operatively coupled to coordinate with each other. The components include without limitation a primary conveyor belt 110, a vision system 130, an ejection means 150, etc.

The mixed waste stream may be deposited on the primary conveyor belt 110 for sorting/segregation operation. The mixed waste stream may be carried from a source like garage, etc. by for example, a secondary conveyor belt (not shown) or other equivalent means and deposited on the primary conveyor belt 110. The primary conveyor belt 110 moves the mixed waste stream at a predefined speed. The secondary conveyor belt may move the mixed waste stream at a speed less than the predefined speed of the primary conveyor belt 110. The predefined speed of the primary conveyor belt 110 may range from 100 mm/s to 10 m/s. In an exemplary embodiment, the predefined speed of the primary conveyor belt 110 is 3.2 m/s. The predefined speed of the primary conveyor belt 110 may be scaled to any value depending upon scale of operation.

The predefined speed of the primary conveyor belt 110 may correlate with the density of the mixed waste stream present over the primary conveyor belt 110. For instance, if the speed of the primary conveyor belt 110 is higher compared to the speed of the secondary conveyor belt, the density of the mixed waste stream on the primary conveyor belt 110 is less. By reducing the density of the mixed waste stream, the primary conveyor belt 110 minimizes overlapping of the waste material present in the mixed waste stream. Minimizing overlap of the waste material in the mixed waste stream results in better identification/detection and accurate ejection of the waste material by the waste sorter 100.

The primary conveyor belt 110 may have a predefined length starting from 4 meter onwards. In an embodiment, the predefined length of the primary conveyor belt 110 is 8 meters. The length of the primary conveyor belt 110 provides stability to all light weight material thereby, preventing them from flying across, rolling or moving on the primary conveyor belt 110.

One or more screens and/or separators may be disposed before the primary conveyor belt 110. The screens and/or separators act as a partial passive barrier to the flow of the mixed waste stream thereby, reducing the density of the mixed waste stream. Similar to the primary conveyor belt 110, the screens and/or separators further minimize overlapping of the waste material for better identification and accurate ejection by the waste sorter 100.

The vision system 130 of the waste sorter 100 may identify and/or classify one or more waste materials present in the mixed waste stream. The vision system 130 may also locate the classified waste materials on the primary conveyor belt 110, as further described below. Each classified waste material may belong to one or more classifiers (or a category of waste materials). Exemplary classifiers may include PET green, PET white, PET general, PET blue, etc. Each waste material may be identified and thereafter assigned a classifier based upon a plurality of identity parameters including but not limited to chemical composition, design, color, size, shape, graphics present on a label/wrapper/surface, groove/design/engraving pattern on any part of the surface, etc.

The vision system 130 may include a neural network to accurately identify, classify and locate one or more waste material within the mixed waste stream moved by the primary conveyor belt 110 in real-time. Alternatives of neural network like deep learning, vision algorithm or any other functionally equivalent algorithm is within the scope of the teachings of the present invention.

Artificial neural networks (ANNs) are computational tools capable of machine learning. The artificial neural networks may be referred to as neural networks. Artificial neural networks consist of many interconnected computing units "neurons" are allowed to adapt to training data and subsequently work together to produce predictions in a model that to some extent resembles processing in biological neural networks.

Neural networks may comprise a set of layers, the first one being an input layer configured to receive an input. The input layer comprises neurons that are connected to neurons comprised in a second layer, which may be referred to as a hidden layer. Neurons of the hidden layer may be connected to a further hidden layer, or an output layer.

In some neural networks, each neuron of a layer has a connection to each neuron in a following layer. Such neural networks are known as fully connected networks. The training data is used to let each connection to assume a weight that characterizes strength of the connection. Some neural networks comprise both fully connected layers and layers that are not fully connected. Fully connected layers in a convolutional neural network may be defined to as densely connected layers.

In some neural networks, signals propagate from the input layer to the output layer strictly in one way, meaning that no connections exist that propagate back toward the input layer. Such neural networks are known as feed forward neural networks. In case connections propagating back towards the input layer do exist, the neural network in question may be referred to as a recurrent neural network.

Machine learning is a discipline that explores the design of algorithms that can learn from data. Machine learning algorithms adapt to inputs to build a model, and can then be used on new data to make predictions. Machine learning has ties to statistics, artificial intelligence and optimization, and is often employed in tasks where explicit rule-based algorithms are difficult to formulate. Examples of such tasks include optical image recognition, character recognition and email spam filtering.

It should be noted that though the vision system 130 of the present invention is described by way of the neural network, the neural network may be replaced with any functional equivalent algorithm/processor and such embodiments are within the scope of the present invention.

The vision system 130 may be trained with a plurality of predefined items/objects using vision to identify existing items like without limitation products currently in use and sold in the market. The vision system 130 may use the identity parameters (defined above) and/or a plurality of other parameters to identify the one or more waste material and classifies them into the classifier. The other parameters may be defined by a state of a waste material and/or environmental conditions. In an embodiment, the other parameter is defined by an intact/complete state, a distorted state, a torn/partial state, a soiled state, a discolored state, an environmental lighting condition and a background color (for example, color of the primary conveyor belt 110).

The vision system 130 helps to locate the classified waste material on the primary conveyor belt 110, even if the classified waste material has a color similar to the primary conveyor belt 110, for example, a black colored material on a black colored primary conveyor belt 110. It further helps the waste sorter 100 in identifying the waste material in one of an intact/complete state (for example, as intended by a manufacturer), a distorted state (for example, in a crumpled or crushed condition, discoloration due to chemical exposure), a torn/partial state (for example, partial wrapper/packaging), a soiled state (for example, dirty and/or oily) thereby improving efficiency and accuracy of the waste sorter 100.

The vision system 130 may be a supervised, semi-supervised and/or unsupervised learning system, i.e. unknown/new items can be used to train the vision system 130. Further, the vision system 130 may be able to predict, based on without limitation, a probability of similarity between the existing predefined items/objects and/or the unknown/new waste material and assign it to an existing or a new classifier.

The vision system 130 of the waste sorter 100 may be disposed over the primary conveyor belt 110. The vision system 130 may be operationally coupled to one or more sensors 131 (depicted in FIG. 3) including but not limited to RGB optical camera, X-ray detector, NIR camera, tactile sensors or a combination thereof. In an embodiment, the sensor 131 of the vision system 130 includes a RGB optical camera and a NIR camera.

The sensor(s) 131 may capture a predefined area 131*a* of the moving primary conveyor belt 110 in a frame. The frame may be communicated to the vision system 130 and subsequently analyzed to identify the waste material(s) in the predefined area 131*a* captured in the frame. Thereafter, the vision system 130 may classify each of the identified waste material into the one or more classifiers. The classifier to be identified by the vision system 130 may be predefined by a user or a computer algorithm. The vision system 130 may include without limitation a Central Processing Unit (CPU), a Graphics Processing Unit (GPU), a Neural Processing Unit (NPU) or a combination thereof to analyze the frame in real-time.

The vision system 130 may define a plurality of areas in the captured frame such that each of the defined areas in the captured frame may correlate with a physical location on the primary conveyor belt 110. Further, each defined area may encompass at least one waste material. Thereafter, the vision system 130 may identify on the basis of at least the identity parameters and/or the other parameters and assign a classifier to at least one of the defined areas of the frame thereby, classifying the waste material(s) in the said defined areas.

The vision system 130 may further determine one or more coordinates (preferably in an x-y format of coordinate geometry) of the defined areas of the classified waste materials to physically locate them on the primary conveyor belt 110. In an embodiment, the vision system 130 determines the coordinates of the defined area (encompassing at least one waste material) with assigned classifier that is to be removed/ejected by the ejection means 150 from the mixed waste stream. The one or more coordinates may correlate to a location of the classified waste material on the primary conveyor belt 110. The one or more coordinates are communicated to the ejection means 150 for subsequent sorting of the said classified waste material.

The primary conveyor belt 110 and the vision system 130 of the waste sorter 100 may function in sync with each other. The sync may be achieved by operationally coupling the said components via a high-speed communication link with the help of for example, an encoder 170 (as depicted in FIG. 2) and/or a controller 190 (as depicted in FIG. 1). The controller 190 and the encoder 170 enables high-speed operation of the primary conveyor belt 110 thereby, increasing the operating speed (also known as per hour waste processing capacity) of the waste sorter 100. Alternatively, the primary conveyor belt 110 and the vision system 130 (or one or more sensors 131 of the vision system 130) may communicate via the encoder 170 directly.

The encoder 170 is operationally coupled with the primary conveyor belt 110. The encoder 170 may detect the predefined speed of the primary conveyor belt 110. In an exemplary embodiment, the encoder 170 detects the predefined speed of the primary conveyor belt 110 in pulse per minute, where each pulse corresponds to a predefined length of the primary conveyor belt 110. The pulse per minute is thereafter communicated to the controller 190 by the encoder 170 in real-time.

Based on the inputs communicated by the encoder 170, the controller 190 may instruct the vision system 130 and/or its respective sensor 131 on when to capture a frame of the primary conveyor belt 110 such that a frame rate and/or shutter speed of the sensor 131 of the vision system 130 synchronizes with the predefined speed of the primary conveyor belt 110. The said synchronization helps to control an amount of area/frame overlap between two consecutively captured frames by the sensor(s) 131 of the vision system 130 with respect to the speed of the primary conveyor belt 110. The amount of area/frame overlap further helps to run the waste sorter 100 in an optimized manner, i.e. the waste sorter 100 efficiently processes the mixed waste stream without overwhelming any resources (like processing power of the vision system 130, operation of ejection means 150, electricity, etc.) or disrupting flow of the mixed waste stream on the conveyor belt(s) (like the primary conveyor belt 110).

The controller 190 may be configured to instruct the one or more sensors 131 of the vision system 130 to capture the frame after a predefined time duration, say, certain amount of pulse per minute (or seconds/milliseconds), as received from the encoder 170. The controller 190 while instructing one or more sensors 131 of the vision system 130 may also take into account a width or a height of the captured frame of the primary conveyor belt 110. In an exemplary embodiment, the controller 190 instructs the sensor 131 of the vision system 130 to capture the frame of the primary conveyor belt 110 having a width of 550 mm after every 1110 pulse per minute as received from the encoder 170. The use of the controller 190 increases the efficiency as well as the speed of the waste sorter 100. It also enables the user to configure the frame rate of the one or more sensors 131 based on the width or the height of the captured frame of the primary conveyor belt 110, thereby making the waste sorter 100 of the present invention to be easily implemented in new as well as already existing MRF plants.

Alternatively, in the embodiment wherein the controller 190 is absent, i.e. the encoder 170 is directly coupled to the vision system 130 and/or the one or more sensors 131 of the vision system 130. The one or more sensors 131 may be configured to capture a frame after a certain amount of pulse per minute, as received from the encoder 170. Or, the vision system 130 may be configured to instruct the one or more sensors 131 to capture a frame after a certain amount of pulse per minute, as received from the encoder 170. In the said embodiment wherein the controller 190 is absent, the frame is captured by the one or more sensors 131 independent of the width or the height of the captured frame of the primary conveyor belt 110.

The vision system 130 may also determine and store analytical data gathered from the captured frame. The analytical data may include but not limited to air pressure, air consumption, throughput, material distribution, sorting volume and purity, brand information, efficiency, output analytics, etc. The analytical data may be stored in a cloud storage or other equivalent means. The analytical data may be retrieved at a predefined time or in real-time for analysis.

The mixed waste stream present on the primary conveyor belt 110, after passing through the vision system 130 and/or the sensors 131 of the vision system 130, may be fed to the ejection means 150 (as depicted in FIG. 3) of the waste sorter 100.

The ejection means 150 may be disposed at an end of the primary conveyor belt 110 such that the primary conveyor belt 110 acts as a link between a source of the mixed waste stream (for example the secondary conveyor belt) and the ejection means 150. The ejection means 150 may be disposed under the primary conveyor belt 110 to launch the classified waste material into air or above the primary conveyor belt 110 to push the classified waste material towards ground. Alternatively, the ejection means 150 may eject the classified waste material sideways as per the requirement/continence of the end user.

The ejection means 150 may eject one or more classified waste material based on the one or more coordinates communicated by the vision system 130. The ejection means 150 may include one or more manifolds (not shown) having a plurality of pneumatic valves (not shown). Each pneumatic valve may be angled at a predefined angle by the user. The predefined angle may range from 15 to 60 degrees. Alternatively, the manifold of the ejection means 150 may automatically change the predefined angle of the pneumatic valves in real-time based on a predefined trajectory to eject the classified waste material from the primary conveyor belt 110 and the one or more coordinates of the defined area from which the classified waste material is to be removed.

Further, the pneumatic valves may be operationally coupled to a compressed air supply. Optionally, each pneumatic valve may release a plurality of controlled bursts of air with the help of a relay or other functionally equivalent mechanism. The relay may turn on or off as instructed by the vision system 130 and/or ejection means 150. While the relay is turned on, it may allow the flow of compressed air through the pneumatic valves. And while the relay is turned off, it may restrict the flow of compressed air through the pneumatic valves.

Each controlled burst of air may last for a few milliseconds. In an exemplary embodiment, each controlled burst of air from the pneumatic valves lasts for 3 milliseconds. Alternatively, the duration of the controlled burst of air may be variably changed in real-time based on the weight of the classified waste material to be ejected. For example, a longer controlled burst of air may be required for heavier materials. Further, the pneumatic valve may be configured to produce the controlled burst of air such that it hits a particular spot of the defined area for example, the center of each of the defined area with the classified waste material (described above). The combination of the predefined angle and the controlled burst of air may help the pneumatic valve of the ejection means 150 in accurately ejecting one or more classified waste material from the primary conveyor belt 110 to a predefined destination/bin.

The pneumatic valve may release the controlled burst of air at a flow rate corresponding to a preconfigured amount for each classifier. Additionally or alternatively, the pneumatic valve may release the controlled burst of air at a flow rate corresponding to an area and/or weight of the classified waste material. In an exemplary embodiment, the pneumatic valve releases the burst of air at 400 L/min for ejecting the classified waste material having area less than 350 mm×350 mm. In another exemplary embodiment, the pneumatic valve releases the burst of air such that the burst of air hits a center point of the area of the classified waste material. Such an arrangement of the pneumatic valves make them power as well as air efficient without compromising on the accuracy of ejection. The accuracy of ejection may correspond to ejection of a classified waste material without disturbing adjacent waste materials.

Other functionally equivalent ejection means 150 like without limitation mechanical/robotic arm with suction grip/pneumatic valve, etc. are within the scope of the teaching of the present invention.

Figure 4:
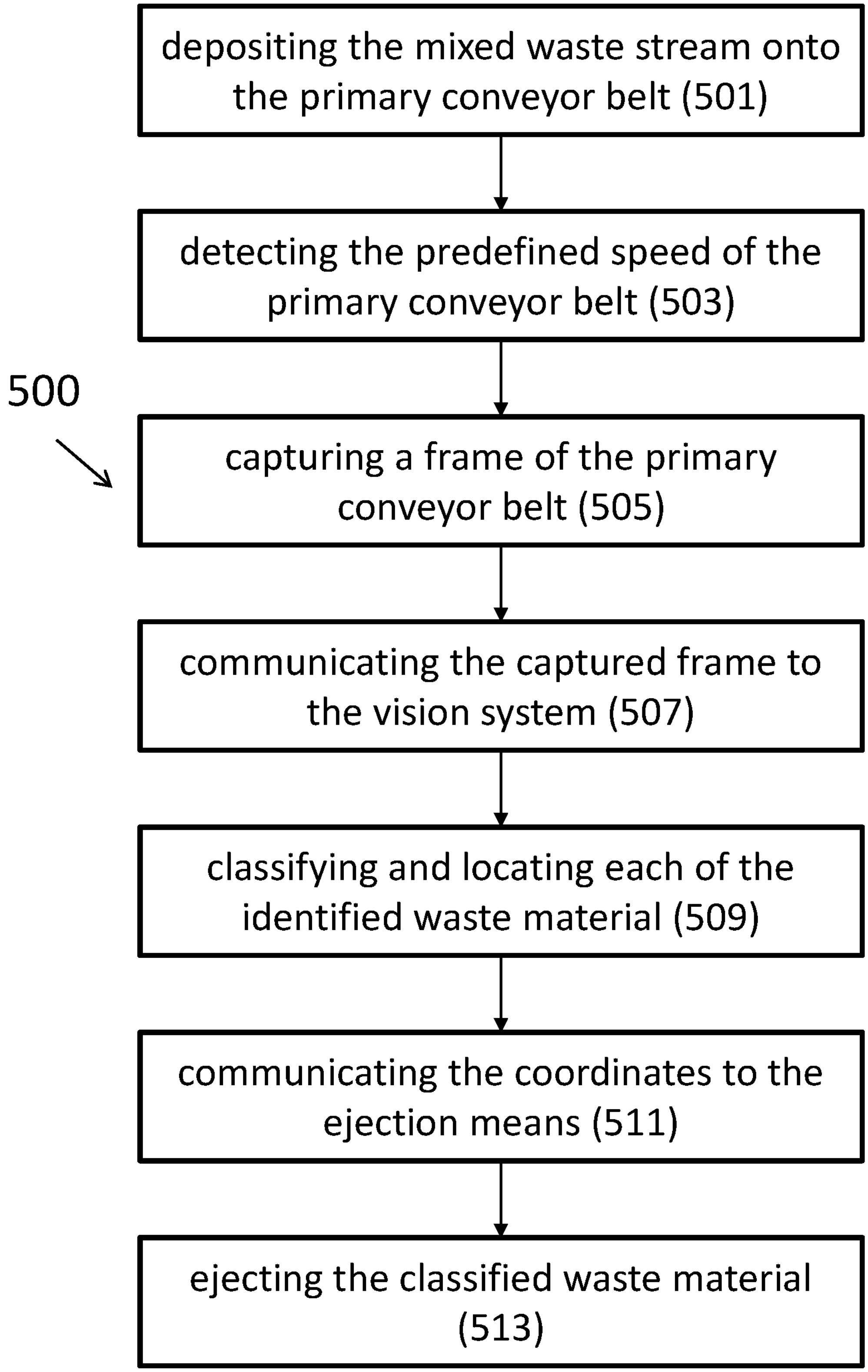
FIG. 4 depicts an exemplary method 500 of the waste sorter 100 in accordance with an embodiment of the present invention.

FIG. 4 depicts an exemplary method 500 of operation of the waste sorter 100. The method 500 may be used to accurately sort/segregate one or more categories of materials from a mixed waste stream. The said materials include without limitation recyclable material, waste material, etc.

The method starts at step 501, by depositing the mixed waste stream onto the primary conveyor belt 110. The mixed waste stream may be deposited by a secondary conveyor belt. The secondary conveyor belt being operated at a relatively slow speed compared to the predefined speed of the primary conveyor belt 110. The said difference in speed helps to maintain a desirable density of the mixed waste stream on the primary conveyor belt 110 with minimum overlap between the materials of the mixed waste stream. Optionally, one or more screens and/or separators may be disposed before the primary conveyor belt 110 to aid the maintenance of the desired density of the mixed waste stream on the primary conveyor belt 110.

At the next step 503, the predefined speed of the primary conveyor belt 110 may be detected by the encoder 170. The predefined speed may be communicated in real time to either the controller 190, the sensor 131, the vision system 130 or a combination thereof.

At the next step 505, each of the one or more sensors 131 capture a frame of the primary conveyor belt 110. The sensors 131 may be directly or indirectly (as described above) configured to capture the frame after a predefined time duration (say, seconds/milliseconds), as received from the encoder 170. This facilitates the vision system 130 to be in sync with the predefined speed of the primary conveyor belt 110.

At the next step 507, the captured frame may be communicated to the vision system 130 and subsequently analyzed to identify the waste material in the captured frame.

At the next step 509, the vision system 130 may classify each of the identified waste material into the one or more classifiers and further determine one or more coordinates (preferably in an x-y format of coordinate geometry) of the defined area with classified waste material to physically locate them on the primary conveyor belt 110.

At the next step 511, the one or more coordinates are communicated by the vision system 130 to the ejection means 150 for subsequent sorting of the said classified waste material.

At the next step 513, the ejection means 150 accurately ejects the one or more classified waste material from the primary conveyor belt 110 to a predefined destination/bin.

The scope of the invention is only limited by the appended patent claims. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

I claim:

1. An automated waste sorter (100) for sorting/segregating one or more categories of materials from a mixed waste stream, comprising:

a primary conveyor belt (110) to move the mixed waste stream at a predefined speed;

an encoder (170) operationally coupled to the primary conveyor belt (110) to detect the predefined speed of the primary conveyor belt (110);

one or more sensors (131) to capture a predefined area (131*a*) of the primary conveyor belt (110) in a frame based on inputs of the encoder (170);

a vision system (130) operationally coupled to the one or more sensors (131), the encoder (170) and the primary conveyor belt (110), the vision system (130) being trained to analyze the frame to identify, classify and locate from the mixed waste stream, waste material using at least one of a plurality of identity parameters and/or a plurality of other parameters, the vision system (130) being further configured to determine one or more coordinates that correlate with a location of the classified waste material on the primary conveyor belt (110); and an ejection means (150) including one or more manifolds to eject the one or more classified waste material based on the one or more coordinates communicated by the vision system (130), each of the manifolds having a plurality of pneumatic valves;

wherein, at least one of the plurality of pneumatic valves is configured to automatically change, by the one or more manifolds, a pre-defined angle of the at least one of the plurality of pneumatic valves based on a pre-defined trajectory and the one or more coordinates and produce a plurality of controlled bursts of air towards the classified waste material, wherein the at least one pneumatic valve is configured to one or more of:

release the plurality of controlled bursts of air at a center of an area of the classified waste material;

release the plurality of controlled bursts of air at a flow rate corresponding to a preconfigured amount for each classifier of the classified waste material; or release the plurality of controlled bursts of air at a flow rate corresponding to at least one of: the area or weight of the classified waste material, thereby, accurately ejecting the classified waste material from the primary conveyor belt (110) to a predefined destination/bin.

2. An automated waste sorter (100) for sorting/segregating one or more categories of materials from a mixed waste stream, comprising:

a primary conveyor belt (110) to move the mixed waste stream at a predefined speed;

an encoder (170) operationally coupled to the primary conveyor belt (110) to detect the predefined speed of the primary conveyor belt (110);

one or more sensors (131) to capture a predefined area (131*a*) of the primary conveyor belt (110) in a frame based on inputs of the encoder (170);

a vision system (130) operationally coupled to the one or more sensors (131), the encoder (170) and the primary conveyor belt (110), the vision system (130) being trained to analyze the frame to identify, classify and locate from the mixed waste stream, waste material using at least one of a plurality of identity parameters and/or a plurality of other parameters, the vision system (130) being further configured to determine one or more coordinates that correlate with a location of the classified waste material on the primary conveyor belt (110); and an ejection means (150) including one or more manifolds to eject the one or more classified waste material based on the one or more coordinates communicated by the vision system (130), each of the manifolds having a plurality of pneumatic valves;

wherein, at least one of the plurality of pneumatic valves is configured to automatically change, by the one or more manifolds, a pre-defined angle of the at least one of the plurality of pneumatic valves based on a pre-defined trajectory and the one or more coordinates and produce a plurality of controlled bursts of air towards the classified waste material, wherein a duration of each of the plurality of controlled bursts of air is changed in real-time based upon weight of the classified waste material, thereby, accurately ejecting the classified waste material from the primary conveyor belt (110) to a predefined destination/bin.

* * * * *